Jan. 15, 1924.
M. SCHULER
ARTIFICIAL HORIZON
Filed Feb. 23, 1918
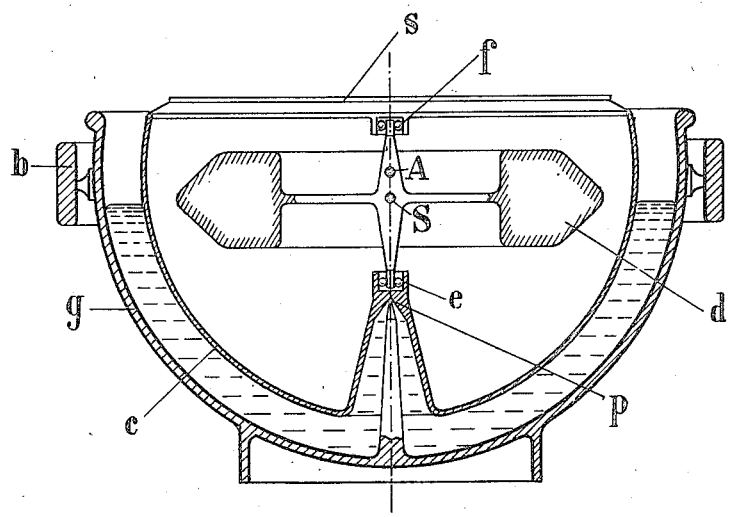
Witnesses;
Chas G Whiteman
H. D. Penney
Inventor:
Max Schuler,
By his Att'y,
J. H. Richards.

Patented Jan. 15, 1924.

1,480,637

UNITED STATES PATENT OFFICE.

MAX SCHULER, OF NEUMUHLEN, NEAR KIEL, GERMANY, ASSIGNOR TO ANSCHÜTZ & CO., OF NEUMUHLEN, NEAR KIEL, HEIKENDORFER, GERMANY.

ARTIFICIAL HORIZON.

Application filed February 23, 1918. Serial No. 218,871.

(GRANTED UNDER THE PROVISIONS OF THE ACT OF MARCH 3, 1921, 41 STAT. L., 1313.)

*To all whom it may concern:*

Be it known that I, MAX SCHULER, a subject of the Emperor of Germany, residing in Neumuhlen, near Kiel, Germany, Heikendorfer Weg 9, have invented certain new and useful Improvements in Artificial Horizons (for which I have filed applications in Germany, Aug. 5, 1916; Austria, June 9, 1917; Hungary, June 9, 1917; Sweden, June 9, 1917; Denmark, June 9, 1917; France, June 9, 1917, and Norway, June 18, 1917), of which the following is a specification.

It is for many purposes important to be able to determine the "true vertical" on a moving body, for instance on a ship. By the "true vertical" is meant the plumb line. It has been proposed to use pendulum or level devices, for the purpose and also gyroscopic apparatus. Obviously all pendulum devices can indicate only the direction of the resultant of gravity and of forces of acceleration due to movements of the body. The same applies also to all level apparatus or to liquid horizons. Nor does the gyroscope form an exception to this general law. It is however possible by means of a correct gyroscope arrangement to obtain a pendulum with a long period of oscillation, and thus to integrate the acceleration pressures during a certain time interval. The integral of all acceleration pressures for the time can never become larger than the maximum change of velocity of the point of suspension, for instance in the case of a ship with a speed of 20 knots, the change of velocity can never become greater than 40 knots (from course to counter-course). Accordingly, the mean acceleration for a given period must be the smaller, the longer the time for which the integral is formed. It will be seen therefore that a pendulum will remain more exactly in the direction of the "true vertical", the longer its own period of oscillation. Neglecting the rotation of the earth and the spherical shape of the earth—that is to say, considering the earth as a plane—a pendulum would always remain vertical if its time of oscillation were so long that it integrated all acceleration pressures from the starting to the arrival of the ship. To make such a pendulum is, of course, impossible in practice even by means of gyroscopic apparatus.

The earth is however in reality a sphere, and on this is based the main idea of the following invention:

Assume that a gyroscope with a vertical axis is suspended by means of a Cardan joint or in a liquid, in such a manner that its axis can assume any direction in space with the least possible friction. By an arrangement of the centre of gravity A below the point of suspension, a constant vertical position of the axis of the gyroscope when it is not rotating, will be ensured. The turning moment $D = Mga.\sin\alpha$ will therefore keep the axis of the gyroscope fast in the vertical position, M in the said formula being the mass of the gyroscope, $g$ acceleration of the earth and $\alpha$ deflexion of the gyroscope from the plumb line. In the event of the gyroscope rotating with a great circumferential velocity, it will have an impulse $=J$ and will describe a precession cone in the time $$T = 2\pi \cdot \frac{J}{Mga},$$

if the rotation of the earth be neglected. It is therefore necessary to refer the precession cone to a fixed star.

If the gyroscope is placed on a moving body for instance on a ship, the equilibrium position of the gyroscope in the plane normal to the course of the ship, will be inclined to a small angle $\delta$ relatively to the "true vertical", the said angle being calculated from the formula:

$$tg\delta = \frac{T}{2\pi} \cdot \frac{v}{R}.$$

Here $v$ is the speed of the ship, and R the radius of the earth. This oblique position of the gyroscope axis is due to the spherical shape of the earth. For the earth's gravity turns in space at each change of position by the ship. For this reason, there must be acting normally to this axis of rotation a moment vector which imparts corresponding turning to the impulse vector of the gyroscope. In the case of a change of speed of the ship, the acceleration produces a turning moment on the gyroscope axis, and the latter is given a deflexion in a plane normal to the acceleration pressure $$tg\mu = \frac{2\pi}{T} \cdot \frac{v}{g}.$$

Obviously, $\delta$ will become equal to $\mu$ when $$T = 2\pi\sqrt{\frac{R}{g}},$$

and this gives us T=84.4 minutes. This is however the time of oscillation of a pendulum of a length equal to the radius of the earth.

If therefore the size, number of revolutions and position of the centre of gravity in a gyroscope with a vertical axis are calculated so that it requires 84 minutes for describing a complete precession cone, it will always remain in equilibrium even in the case of any desired movements of the point of suspension. For the acceleration pressures produced will at once bring the gyroscope into the new equilibrium position which corresponds to the speed at the time of the point of suspension on the earth's surface. Any difference that may exist between the gyroscopic horizon and the earth's horizon, can be readily calculated from the speed of the point of suspension relatively to the earth, and inserted as correction into a measurement. This is the angle $\delta$, the formula for calculating which is given above.

As the difference between the angles $\delta$ and $\mu$ remains sufficiently small with the speeds of travel obtaining at present, even when the time of oscillation of the gyroscope is not exactly 84.4 minutes, it is possible, according to the degree of accuracy required, to make the time of oscillation somewhat smaller. With a time of oscillation of 60 minutes the greatest difference which could exist between $\delta$ and $\mu$ is for instance 9 arc minutes for a ship's speed of 15 meters per second (about 30 knots). In the present state of technical industry, it is therefore sufficient, that the gyroscope should describe a precession cone in about 60 minutes.

In the preceding considerations, no account has been taken of the rotation of the earth. It is however obvious that it is perfectly immaterial for the working of the gyroscope, whether it moves from one point to another owing to the circumferential velocity of the earth or owing to the speed of the ship. Accordingly, corrections could be still calculated in accordance with the formula given in the preceding for the angle $\delta$. They are several times greater than the corrections caused by movements of the ship. As however the movements of the earth are known, these corrections could be easily tabulated.

The duration of the precession cone of the Fleuriais gyroscope hitherto used, amounts to less than one minute. In the Annals of Hydrography, year 1916, vol. 2, it is maintained that such gyroscopes could give the "true vertical" at sea. From the above considerations it will be seen that this is correct only when the ship is not traveling. For even in the case of slight alterations of course and speed, acceleration pressures are produced, which falsify indications of the gyroscope. And also no corrections for the rotation of the earth are provided in the Fleuriais gyroscope.

According to this invention, the important result is therefore obtained, to determine in fact the "true vertical" on a ship by means of a gyroscope. To that end, it is necessary, as already stated, to make the time of a precession cone nearly 100 times as long as that hitherto adopted. While Fleuriais neglects the rotation of the earth, and ship's movements result in gross errors, the correction for the rotation of the earth in the instrument described is several times larger than the correction for ship movements. At the same time, in the foregoing considerations it is shown for the first time how the said corrections are to be introduced.

In a Cardan suspension gyroscopic horizon it is not necessary that the position of the centre of gravity about the two Cardan axes normal to each other, should be the same, on the contrary, use can be made here also for instance of the invention described in specification No. 1141099 U. S. Patent. The essential feature of the invention will be still there, as long as the gyroscope axis describes the whole precession cone in 60 to 80 minutes.

A construction of a gyroscope horizon is illustrated by way of example in the accompanying drawing.

A vessel $g$ is filled with a liquid, for instance water or oil, and suspended in the Cardan ring $b$. In the liquid floats the vessel $c$ in which is mounted the gyroscope $d$. The axis of the gyroscope is vertical and runs in bearings $e$ and $f$. The gyroscope is preferably elecrtically driven. Normal to the gyroscope axis, on the floating body $c$ is placed a mirror $s$. The mirror is horizontal when the gyroscope axis is vertical. The centre of gravity of the floating system is at the point S, whilst the point of buoyancy of the liquid is, say, at the point A. Between the two is the distance $a$. According to the invention, this distance is calculated so that with the normal number of revolutions of the gyroscope, the precession cone will be described in approximately 84 minutes, according to the degree of accuracy desired. For the proper adjustment of the position of the centre of gravity or of the point of buoyancy regulating weights can be used of course in the known manner. For the purpose of centering the floating body in the vessel $g$ the pin $p$ is used which in the known manner can be utilised at the same time for conveying electric current when the gyroscope is to be driven by electricity.

The liquid in the vessel $g$ in the event of acceleration pressures, will assume a direction in accordance with the resultant of gravity and acceleration, whilst the mirror $s$ can be used as a "true horizon." By reading by means of the mirror, it is therefore possible to determine the vertical on board ship.

What I claim is:—

In a device of the kind described, an outer vessel, an inner vessel, a liquid in the outer vessel buoyantly supporting the inner vessel, a gyroscope mounted in the inner vessel with its axis vertical and having its center of gravity below the center of flotation of the liquid, the distance of said center of gravity below said center of flotation being such as to cause the gyroscope when running at the normal speed to describe its precession cone in eighty-four minutes and a mirror mounted on top of the inner vessel in a plane normal to the axis of the gyroscope.

In witness whereof I have hereunto signed my name this 29th day of August 1917, in the presence of two subscribing witnesses.

MAX SCHULER.

Witnesses:
   WOLFGANG OTTO,
   ERNST BRUCK.